United States Patent
Kaushik et al.

(10) Patent No.: US 12,468,505 B1
(45) Date of Patent: Nov. 11, 2025

(54) SYSTEMS AND METHODS FOR GENERATING VISUAL REPRESENTATIONS OF SIMILARITIES BETWEEN REPORTS

(71) Applicant: PWC Product Sales LLC, New York, NY (US)

(72) Inventors: Venkatesh Kaushik, Charlotte, NC (US); Mitchell J. Mccarthy, Monterey, CA (US); Syed Mohammed Zahref Beyabani, San Diego, CA (US); Mukeshwar Singh Braria, Panchkula (IN); Chakkarapani Vijayakumar, Chennai (IN); Trevon Adams, Tampa, FL (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/659,782

(22) Filed: May 9, 2024

(51) Int. Cl.
*G06F 7/02* (2006.01)

(52) U.S. Cl.
CPC ..................... *G06F 7/02* (2013.01)

(58) Field of Classification Search
CPC ........................................ G06F 7/02
See application file for complete search history.

(56) References Cited

U.S. PATENT DOCUMENTS

| | | | |
|---|---|---|---|
| 10,321,167 B1* | 6/2019 | Edell | G06F 16/901 |
| 2015/0081681 A1* | 3/2015 | Vohra | G06F 16/2457 707/723 |
| 2021/0089764 A1* | 3/2021 | Shorter | G06F 40/30 |
| 2022/0188885 A1* | 6/2022 | Blackman | G06F 16/182 |
| 2023/0282019 A1* | 9/2023 | van Rotterdam | G06V 30/40 382/218 |
| 2024/0152510 A1* | 5/2024 | Appalaraju | G06F 18/22 |

* cited by examiner

*Primary Examiner* — Dangelino N Gortayo
(74) *Attorney, Agent, or Firm* — Morrison & Foerster LLP

(57) ABSTRACT

A system for generating a visual representation of similarities between reports is provided. The system receives input data comprising a plurality of reports from one or more information sources. For each report from the plurality of reports, the system extracts metadata. The metadata is distinct from data values in the respective report and indicates a plurality of data types of the data values in the respective report. For each pairwise combination of reports, the system computes one or more similarity metrics based on the extracted metadata for each report in the respective pairwise combination. Each similarity metric indicates a degree of similarity between metadata of a pairwise combination of reports. The system generates and displays a visual representation of similarities between each pairwise combination of reports. The visual representation is generated based on the one or more computed similarity metrics for each pairwise combination.

16 Claims, 7 Drawing Sheets

SYSTEMS AND METHODS FOR GENERATING VISUAL REPRESENTATIONS OF SIMILARITIES BETWEEN REPORTS

FIELD

The present disclosure relates generally to systems and methods for generating visual representations of data. In particular, the present disclosure relates to systems and methods for generating visual representations of similarities between reports.

BACKGROUND

Organizations generate a variety of reports in the course of business and store them in various databases. The stored reports may be leveraged to make informed, data-driven business decisions. However, over time, databases can become saturated with an abundance of reports. Some of the reports may be duplicative due to recurring reporting, redundant reporting across business units, or lack of governance. Storage and analysis of these duplicative reports can be resource intensive and costly.

SUMMARY

Maintaining databases of reports allows an organization to make informed business decisions based on the stored reports. However, as time passes, the volume of reports stored by an organization may become unmanageable. Some reporting may be performed on a recurring basis, resulting in an abundance of similar reports. Multiple business units within an organization may generate similar reports and store them in various locations, creating a sprawl of redundant information across multiple databases. The sheer volume of reports in these various databases may make it challenging to identify pertinent information and extract reliable business insights.

Accordingly, provided herein are systems and methods for generating visual representations of similarities between reports. The described systems and methods may generate visual representations of similarities between reports using metadata extracted from reports drawn from a variety of databases. In particular, the systems and methods may use the metadata to calculate similarity metrics for pairwise combinations of reports. A visual representation of similarities between reports may be generated based on the similarity metrics. The resulting visualization may optionally be used to decide whether any pairwise combinations of reports are similar enough to merge, which would reduce the number of reports stored in an organization's systems. The consolidation of reports can reduce resource utilization and thereby enable cost savings.

A system for generating a visual representation of similarities reports can include one or more processors configured to cause the system to: receive input data comprising a plurality of reports from one or more information sources; for each report from the plurality of reports, extract metadata, wherein the metadata is distinct from data values in the respective report and indicates a plurality of data types of the data values in the respective report; for each pairwise combination of reports from the plurality of reports, compute one or more similarity metrics based on the extracted metadata for each report in the respective pairwise combination, wherein each similarity metric of the one or more similarity metrics indicates a degree of similarity between metadata of a pairwise combination of reports from the plurality of reports; and generate and display a visual representation of similarities between each pairwise combination of reports from the plurality of reports, wherein the visual representation is generated based on the one or more computed similarity metrics for each pairwise combination.

The plurality of data types may comprise any one or more of titles, summaries, tables, visualization elements, creation dates, or keywords. The one or more similarity metrics may comprise a first similarity metric representing a first relationship between metadata of a pairwise combination of reports from the plurality of reports and a second similarity metric representing a second relationship between the metadata of the pairwise combination of reports. The first similarity metric may comprise a Jaccard score. The second similarity metric may comprise one or more directional similarity scores. Computing one or more similarity metrics may comprise: computing, for each pairwise combination of reports from the plurality of reports, a first similarity metric representing a first relationship between metadata of the respective pairwise combination of reports; selecting a subset of pairwise combinations of reports from the plurality of reports for which the first similarity metric exceeds a minimum threshold degree of similarity; and computing a second similarity metric for each pairwise combination of reports in the selected subset, wherein the second similarity metric represents a second relationship between the metadata of the respective pairwise combination of reports in the selected subset. Each similarity metric of the one or more similarity metrics may indicate an inferred degree of combinability of a pairwise combination of reports.

The one or more processors may be configured to cause the system to generate and display one or more instructions for one or more report processing operations for at least one pairwise combination of reports from the plurality of reports based on the one or more similarity metrics. The one or more report processing operations may comprise merging a pairwise combination of reports. The one or more processors may be configured to cause the system to execute the instructions for the one or more report processing operations on at least one pairwise combination of reports from the plurality of reports.

The visual representation of similarities between each pairwise combination of reports from the plurality of reports may comprise a first region visually indicating a first degree of similarity for a first pairwise combination of reports and a second region visually indicating a second degree of similarity for a second pairwise combination of reports. The one or more processors may be configured to cause the system to: detect a first user input comprising a selection of the first region; and in response to detecting the first user input, display the one or more similarity metrics for the first pairwise combination of reports. The one or more processors may be configured to cause the system to: detect a first user input comprising a selection of the first region; and in response to detecting the first user input, display a plurality of visual indications of options for report processing operations that can be executed on the first pairwise combination of reports. The one or more processors may be configured to cause the system to: detect a second user input comprising a selection of a visual indication of the plurality of visual indications, wherein the visual indication represents a first option from the plurality of options for report processing operations; and in response to detecting the second user input, execute the first option on the first pairwise combination of reports.

A method for generating a visual representation of similarities between reports can include receiving input data comprising a plurality of reports from one or more information sources; for each report from the plurality of reports, extracting metadata, wherein the metadata is distinct from data values in the respective report and indicates a plurality of data types of the data values in the respective report; for each pairwise combination of reports from the plurality of reports, computing one or more similarity metrics based on the extracted metadata for each report in the respective pairwise combination, wherein each similarity metric of the one or more similarity metrics indicates a degree of similarity between metadata of a pairwise combination of reports from the plurality of reports; and generating and displaying a visual representation of similarities between each pairwise combination of reports from the plurality of reports, wherein the visual representation is generated based on the one or more computed similarity metrics for each pairwise combination.

A non-transitory computer readable storage medium can store instructions that, when executed by one or more processors of an electronic device, cause the device to: receive input data comprising a plurality of reports from one or more information sources; for each report from the plurality of reports, extract metadata, wherein the metadata is distinct from data values in the respective report and indicates a plurality of data types of the data values in the respective report; for each pairwise combination of reports from the plurality of reports, compute one or more similarity metrics based on the extracted metadata for each report in the respective pairwise combination, wherein each similarity metric of the one or more similarity metrics indicates a degree of similarity between metadata of a pairwise combination of reports from the plurality of reports; and generate and display a visual representation of similarities between each pairwise combination of reports from the plurality of reports, wherein the visual representation is generated based on the one or more computed similarity metrics for each pairwise combination.

BRIEF DESCRIPTION OF THE FIGURES

The following figures show various systems and methods for generating visual representations of similarities between reports. The systems and methods shown in the figures may have any one or more of the characteristics described herein.

DETAILED DESCRIPTION

Figure 1:
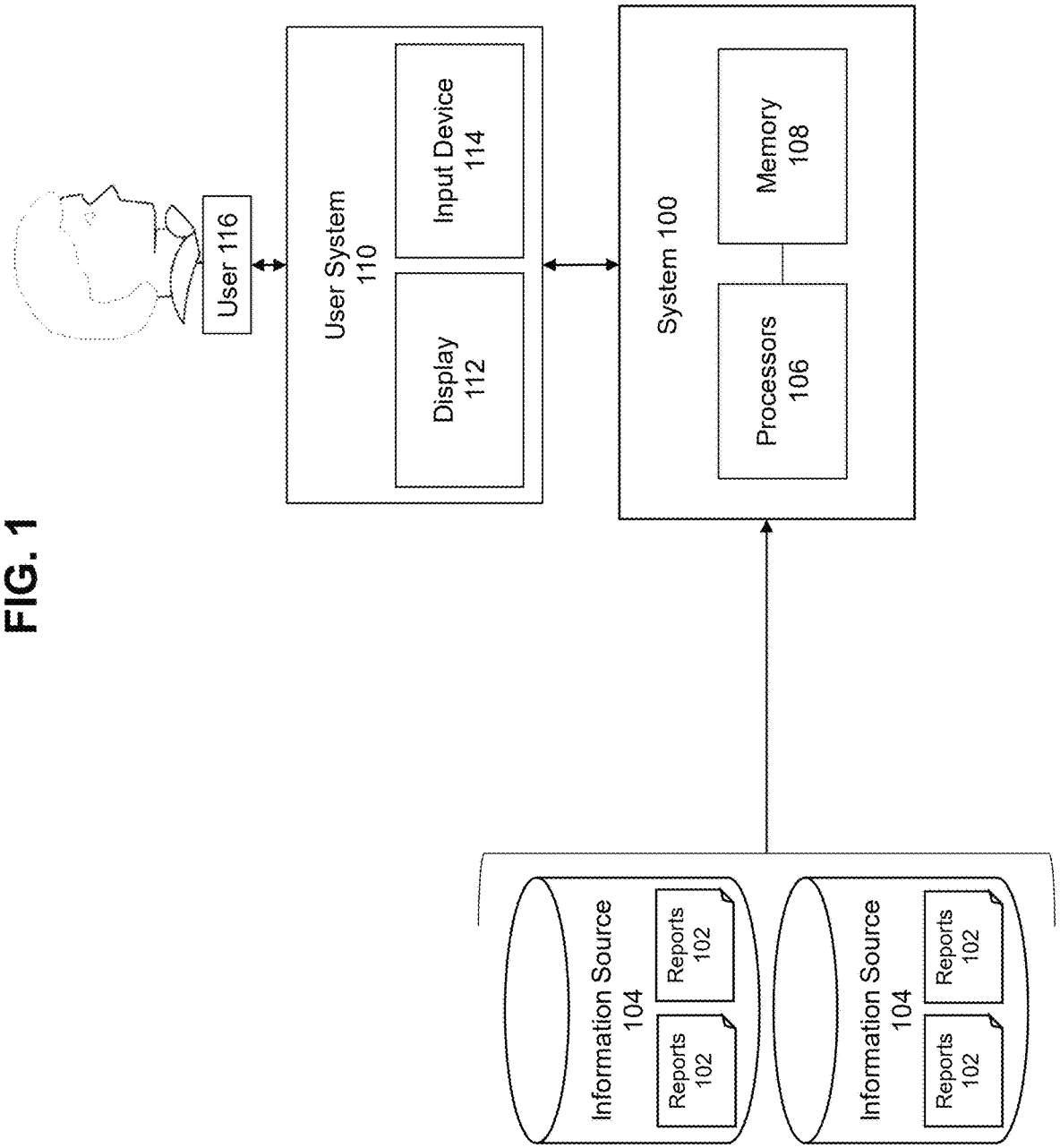
FIG. 1 shows a system for generating visual representations of similarities between reports, according to some embodiments.

As described, organizations store reports because they may contain important business information that can enable prudent decision-making. However, due to recurring analyses, duplicative reporting across business units, lack of governance, or some combination thereof, databases often include redundant reports that could be consolidated. Redundant reports are undesirable because they take up storage space and incur associated storage costs. Furthermore, having an excess of reports may obscure important insights contained in an organization's systems.

Accordingly, provided herein are systems and methods for visualizing similarities between reports. The described systems and methods allow a user to visualize redundancies in a reporting database. In particular, the systems and methods may extract metadata from reports contained in a variety of databases and calculate similarity metrics for each pairwise combination of reports, which may then be used to generate visual representations of similarities between the pairwise combinations of reports. The visual representations may help a user identify pairs of similar reports that can be consolidated.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer-readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FGPAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

FIG. 1 illustrates a block diagram of a system 100 for generating visual representations of similarities between reports 102. As shown, system 100 may be a computer system comprising one or more processors 106 and at least one memory 108. For example, system 100 may be or may comprise a laptop computer, a desktop computer, a mobile device (e.g., a smart phone), a tablet computer, or a server. Processor(s) 106 may include one or more processing units (e.g., digital circuitry, microcontrollers, microprocessors, embedded processors, central processing units (CPUs), graphics processing units (GPUs), etc.). Memory 108 may comprise any device configured to provide storage, including electrical, magnetic, or optical memory. For instance, memory 108 may include random-access memory (RAM), a cache, a hard drive, a CD-ROM drive, a tape drive, or a removable storage disk. Software comprising programs or instructions for generating visual representations of similarities between reports may be stored in memory 108 for execution by processors 106.

System 100, as described, may be coupled to one or more information sources 104. Reports 102 may be provided to system 100 from information sources 104. Reports 102 can include any written or otherwise text-based materials including (but not limited to) Excel files (e.g., XLSX or XLS files), CSV files, JSON files, PDF files, word processor files (e.g., Microsoft Word .doc or .docx files), plain text files (e.g., .txt files), rich text files (e.g., .rtf files), markup files (e.g., LaTex files), or some combination thereof. Information sources 104 can include servers or databases that store reports (e.g., Tableau, SAP Business Objects, or Microsoft Power BI) as well as storage devices such as USB drives, hard drives, or storage disks. System 100 may automatically receive reports 102 from information sources 104 in real time (e.g., as the reports are uploaded to information source 104) or periodically (e.g., at predetermined times of day). Additionally, system 100 may be configured to request specific reports 102 from an information source 104, for example based on instructions received from user 116. System 100 may additionally be configured to receive reports 102 via a manual upload by user 116.

System 100 may receive inputs from a user 116. To facilitate the provision of information to and from user 116, system 100 may be communicatively coupled to a user system 110. User system 110 can include a display 112 (e.g., a computer monitor or a screen) configured to be controlled by processors 106. Additionally, user system 110 may include one or more input devices 114 such as a keyboard, a mouse, or a touch sensor. User 116 may use user system 110 to upload reports 102 to system 100. After a visual representation of similarities between reports is generated, system 100 may display the visual representation to user 116 via user system 110. In some embodiments, user system 110 may allow user 116 to interact with system 100, for example to request a plurality of options for report processing operations that can be executed on a pairwise combination of reports or to execute a report processing operation.

Figure 2:
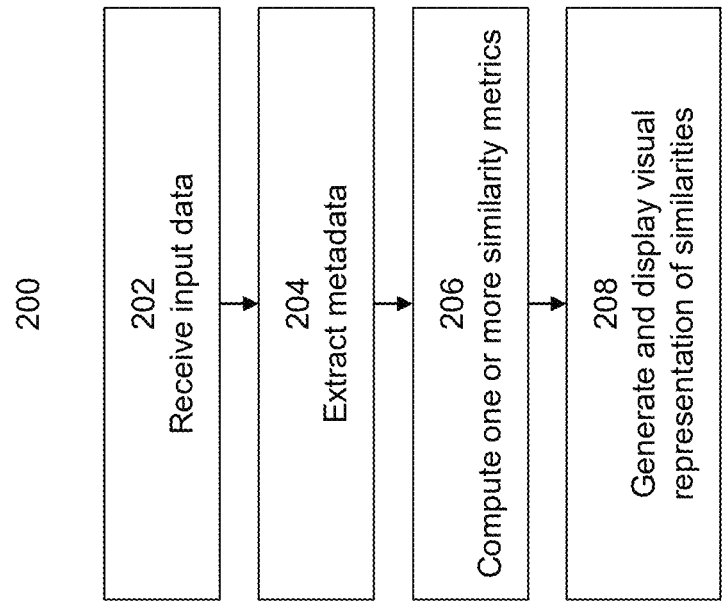
FIG. 2 shows a method for generating a visual representation of similarities between reports, according to some embodiments.

An exemplary method for generating a visual representation of similarities between reports is provided in FIG. 2. Method 200 may be executed by a system for generating visual representations of similarities between reports such as system 100 shown in FIG. 1. In some embodiments, instructions configured to cause one or more processors of a computer system (e.g., system 100) to execute method 200 may be stored by a computer-readable medium (e.g., memory 108 of system 100 shown in FIG. 1).

Method 200 may begin at step 202 with the receipt of input data (e.g., reports 102 shown in FIG. 1) by processors of the system executing method 200 from one or more information sources. The information sources may include sources such as information sources 104 shown in FIG. 1 and/or the users of the system executing method 200. The reports may include written or otherwise text-based materials such as reports 102 shown in FIG. 1. The reports may be received automatically or manually uploaded to the system.

At step 204, the system may extract metadata from the input data. Metadata, as used herein, refers to data about a report that is distinct from the substantive content contained in the report. Metadata may comprise the data types present in a report but not the data values. For instance, metadata extracted from the input data may include (but is not limited to) titles, headers, summaries, tables (e.g., column and row labels), visualization elements, or keywords. By extracting metadata for use in further processing steps, the system may avoid exposing a user to potentially sensitive and private content contained in the reports. This approach may ensure confidentiality of client data and compliance with any applicable data security regulations.

In some embodiments, the extracted metadata may be stored in an open standard file format (e.g., JSON) in a metadata store (e.g., Microsoft Azure Cosmos Database). These choices of file format and metadata store allow for flexible and efficient storage and enable simple retrieval for downstream processing steps.

After extracting metadata from the input data at step 204, the method 200 may proceed to step 206. Step 206 can include computing, by the one or more processors, one or more similarity metrics for each pairwise combination of reports from which metadata was extracted in step 204. The one or more similarity metrics may be based on the metadata extracted from the reports. In some embodiments, the metadata extracted from the reports may be retrieved by one or more processors of the system from a metadata store (e.g., Microsoft Azure Cosmos Database) for use in step 206.

In some embodiments, the one or more similarity metrics may include a first similarity metric representing a first relationship between metadata of a pairwise combination of reports from the plurality of reports and a second similarity metric representing a second relationship between the metadata of the pairwise combination of reports. In some embodiments, each similarity metric may indicate an inferred degree of combinability of a pairwise combination of reports. In some embodiments, the first similarity metric and the second similarity metric may be computed simultaneously for each pairwise combination of reports.

In some embodiments, the first similarity metric may be a Jaccard score. A Jaccard score is a measure of similarity that represents the ratio of the size of the intersection of two sets |A∩B| to the size of the union of the two sets |A∪B|. A Jaccard score J(A,B) can be computed using Equation 1:

$$J(A, B) = \frac{|A \cap B|}{|A \cup B|} \quad \text{(Eq. 1)}$$

In Equation 1, A is a first set of elements and B is a second set of elements. The size of the intersection of A and B, |A∩B|, is determined by quantifying the number of common elements in set A and set B. The size of the union of A and B, |A∪B|, is determined by quantifying the total number of unique elements in set A and set B combined. The size of the union of A and B can be computed using Equation 2:

$$|A \cup B| = |A| + |B| - |A \cap B| \quad \text{(Eq. 2)}$$

When calculating the Jaccard score for a pairwise combination of reports, each element in sets A and B represents a distinct metadata element present in reports A and B, respectively. The size of the intersection of reports A and B represents the number of common metadata elements that exist across reports A and B, while the size of the union of reports A and B represents the total number of unique metadata elements that exist across reports A and B. In some embodiments, one or more processors of system 100 may determine the number of common metadata elements in a pairwise combination of reports by performing field-to-field text comparison on the metadata elements extracted from the reports. A common metadata element may be a text string (e.g., a graph title, a row header, or a column header) that is present in both reports in a pairwise combination of reports. In some embodiments, an exact match may not be required to determine that a common metadata element exists.

In some embodiments, a second similarity metric is computed for a pairwise combination of reports. While the Jaccard score provides an overall degree of similarity between a pairwise combination of reports, it does not indicate the direction of the overlap between the reports (i.e., whether more elements of report A also exist in report B or whether more elements of report B also exist in report A). This information could be helpful if, for example, a user wanted to merge two reports that have been found to be similar based on their Jaccard score because it would indicate that it may be preferable to merge report A into report B rather than to merge report B into report A.

In some embodiments, the second similarity metric comprises one or more directional similarity scores. A directional similarity score is the ratio of the number of common metadata elements in a pair of reports to the total number of metadata elements in one of those reports. The ratio represents the proportion of metadata elements in a report that overlap with the metadata elements of the other report in a pairwise combination. The respective directional similarity scores D(A) and D(B) for two reports A and B in a pairwise combination of reports can be computed using Equations 3 and 4:

$$D(A) = \frac{|A \cap B|}{|A|} \quad \text{(Eq. 3)}$$

$$D(B) = \frac{|A \cap B|}{|B|} \quad \text{(Eq. 4)}$$

After computing the one or more similarity metrics for each pairwise combination of reports at step 206, a visual representation of the similarities between reports may be generated and displayed at step 208. The generated visual representation of similarities may indicate the degree of similarity between each pairwise combination of reports analyzed.

The visual representation of similarities may be provided to a user via a user interface (e.g., user system 110 shown in FIG. 1). In some embodiments, the visual representation of similarities may be displayed on a web-based user interface that may be accessed from any device that is connected to the Internet (e.g., laptop computer, desktop computer, tablet, or smartphone). Specifically, the visual representation of similarities may be displayed to the user as a graphical user interface (GUI) configured to allow the user to interact with the visual representation in order to receive additional information. If, for example, the user wishes to be provided with additional information about the similarities between a pairwise combination of reports, the user may select a region visually indicating the degree of similarity between the pairwise combination of reports. Upon receipt of the selection, the user interface may be configured to display data about the pairwise combination, such as the one or more similarity metrics for the pairwise combination or a plurality of options for report processing operations that can be executed on the pairwise combination.

Figure 3:
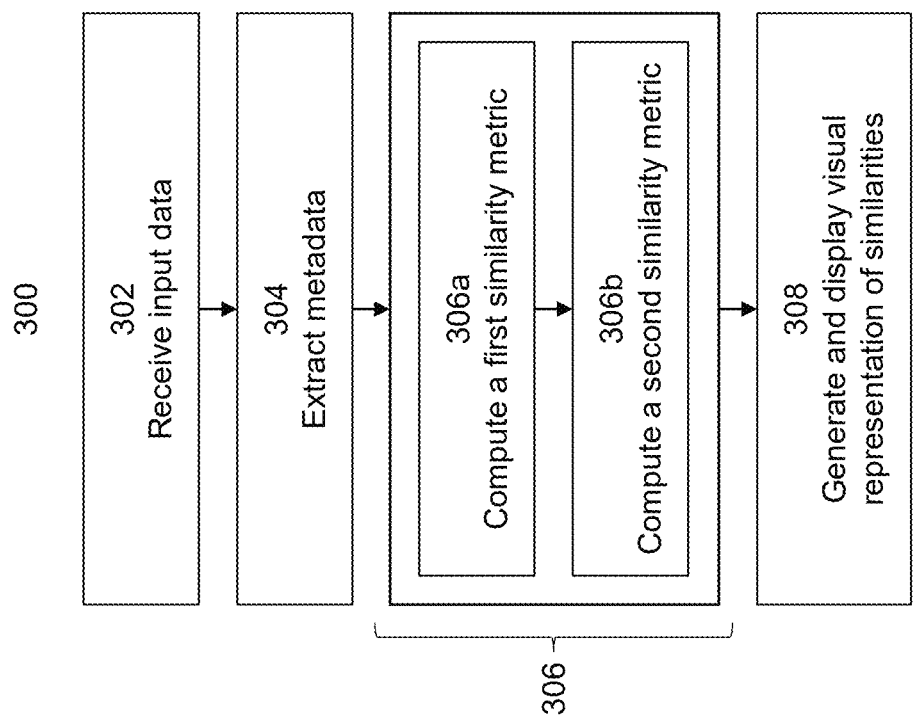
FIG. 3 shows a method for generating a visual representation of similarities between reports, according to some embodiments.

FIG. 3 shows an exemplary method for generating a visual representation of similarities between reports. Method 300 may share one or more characteristics of method 200 as discussed above with reference to FIG. 2.

Method 300 may begin at step 302 with the receipt of input data. Step 302 may share one or more characteristics of step 202 of method 200 as discussed above with reference to FIG. 2.

After receiving the input data at step 302, the method 300 may proceed to step 304. Step 304 can include extracting metadata from the input data. Step 304 may share one or more characteristics of step 204 of method 200 as discussed above with reference to FIG. 2.

Step 306 can include computing, by the one or more processors, one or more similarity metrics for each pairwise combination of reports from which metadata was extracted in step 304. As in step 206 of FIG. 2, the one or more similarity metrics may be based on the metadata extracted from the reports. The one or more similarity metrics may include a first similarity metric representing a first relationship between metadata of a pairwise combination of reports from the plurality of reports and a second similarity metric representing a second relationship between the metadata of the pairwise combination of reports.

In some embodiments, the first similarity metric and second similarity metric may be computed consecutively for each pairwise combination of reports. The first similarity metric may be computed at step 306a. As in method 200, the first similarity metric may be a Jaccard score. After the first similarity metric is computed, the second similarity metric may be computed at step 306b. As in method 200, the second similarity metric may be one or more directional similarity scores.

After computing the similarity metrics, the system can proceed to step 308. At step 308, the system may generate and display a visual representation of similarities between reports. Step 308 may share one or more characteristics of step 208 of method 200 as discussed above with reference to FIG. 2.

Figure 4:
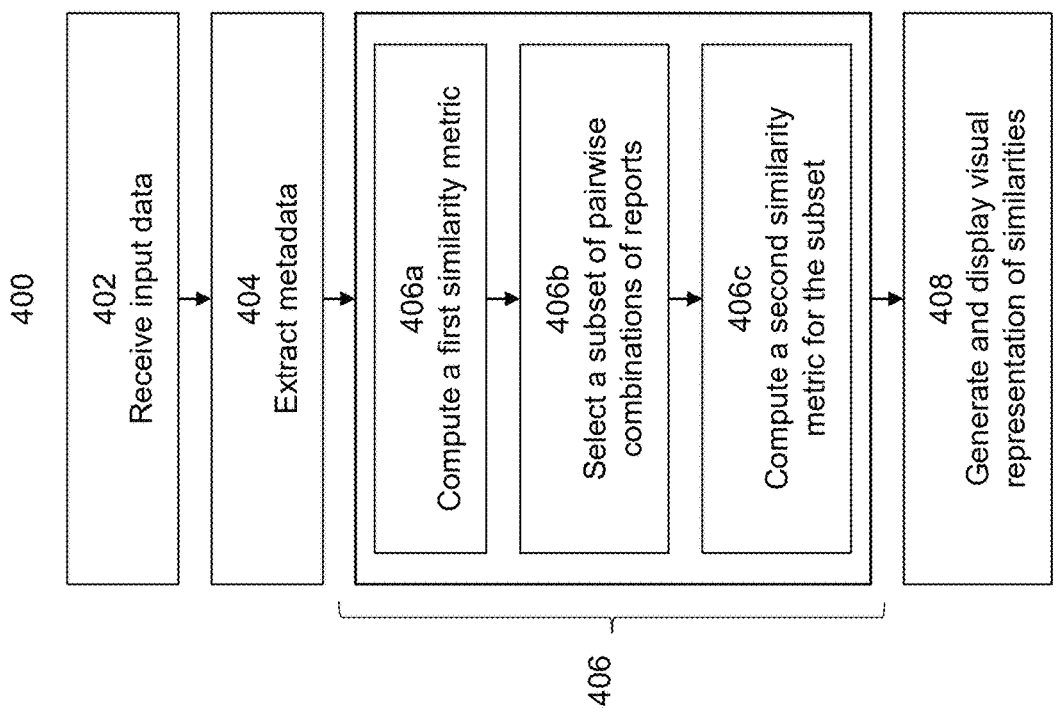
FIG. 4 shows a method for generating a visual representation of similarities between reports, according to some embodiments.

FIG. 4 shows an exemplary method for generating a visual representation of similarities between reports. Method 400 may share one or more characteristics of method 200 as discussed above with reference to FIG. 2.

Method 400 may begin at step 402 with the receipt of input data. Step 402 may share one or more characteristics of step 202 of method 200 as discussed above with reference to FIG. 2.

After receiving the input data at step 402, the method 400 may proceed to step 404. Step 404 can include extracting metadata from the input data. Step 404 may share one or more characteristics of step 204 of method 200 as discussed above with reference to FIG. 2.

Step 406 can include computing, by the one or more processors, one or more similarity metrics for each pairwise combination of reports from which metadata was extracted in step 404. As in step 206 of FIG. 2, the one or more similarity metrics may be based on the metadata extracted from the reports. The one or more similarity metrics may include a first similarity metric representing a first relationship between metadata of a pairwise combination of reports from the plurality of reports and a second similarity metric representing a second relationship between the metadata of the pairwise combination of reports.

In some embodiments, the system may compute a first similarity metric for each pairwise combination of reports and only proceed to compute a second similarity metric for a selected subset of those pairwise combinations. This may be desirable if, for example, there is a large volume of reports, and calculating a second similarity metric for each pairwise combination of reports would be unnecessary (e.g., because a user is only interested in reports with a first similarity metric within a desired numerical range).

The first similarity metric may be computed at step 406a. As in method 200, the first similarity metric may be a Jaccard score. After the first similarity metric is computed, a subset of pairwise combinations of reports may be selected for which the first similarity metric exceeds a minimum threshold degree of similarity at step 406b. The minimum threshold degree of similarity may be predetermined, may be automatically and/or adaptively set by the system, and/or may be manually chosen by a user. For example, the minimum threshold degree of similarity may be a predetermined Jaccard score below which a user is not interested in calculating a second similarity metric. Once the subset of reports above the minimum threshold degree of similarity has been selected (and, optionally, confirmed by a user, for example using a graphical user interface such as the one described below with respect to FIG. 5), a second similarity metric may be computed for the subset at step 406c. As in method 200, the second similarity metric may be one or more directional similarity scores.

After computing the similarity metrics, the system can proceed to step 408. At step 408, the system may generate and display a visual representation of similarities between reports. Step 408 may share one or more characteristics of step 208 of method 200 as discussed above with reference to FIG. 2.

In some embodiments, the visual representation of similarities between reports generated and displayed in any of methods 200, 300, or 400 may include one or more heat maps. A heat map may be generated by color coding or otherwise labeling cells in a table displaying Jaccard scores and/or directional similarity scores. For example, a table of Jaccard scores may be provided in which each column and row corresponds to a report, such that each cell in the table indicates a Jaccard score for a pairwise combination of reports. A similar table of directional similarity scores may also be generated. The tables may be turned into heat maps by color-coding or otherwise labeling the cells based on their respective scores. For instance, cells corresponding to Jaccard scores and/or directional similarity scores between 81-100 may be a first color or pattern, cells corresponding to scores between 61-80 may be a second color or pattern, cells corresponding to scores between 41-60 may be a third color or pattern, cells corresponding to scores between 21-40 may be a fourth color or pattern, and cells corresponding to scores between 0-20 may be a fifth color or pattern. Any other suitable score breakdown may also be used.

In some embodiments, certain colored cells may be associated with a system recommendation to merge the pairwise combinations of reports corresponding to the respective cells. For example, the system may automatically generate a recommendation to merge pairwise combinations of reports represented by cells having a color that corresponds to a Jaccard score or directional similarity score exceeding a predetermined value. Using the user interface, a user may select whether to accept or ignore the recommendations indicated by the heat maps. In some embodiments, the system may not generate explicit recommendations based on the heat maps and instead leave to the user the determination of whether pairwise combinations of reports should be merged.

In some embodiments, any of methods 200, 300, or 400 may optionally include generating and displaying one or more instructions for one or more report processing operations that can be executed on at least one pairwise combination of reports. The one or more instructions may be generated and displayed after or concurrently with steps 208, 308, or 408. The instructions may be provided to a user via a user interface (e.g., user system 110 shown in FIG. 1). The instructions may comprise recommended report processing operations based on the one or more similarity metrics computed for each pairwise combination of reports. For example, the system may recommend merging a pairwise combination of reports or maintaining a pairwise combination of reports as two separate reports. Performance of the recommended report processing operations may be optional or may be automatically completed by one or more processors of the system. In some embodiments, the user can manually execute one or more of the instructions for desired report processing operations. In some embodiments, the system can automatically execute one or more of the instructions for report processing operations.

Figure 5A:
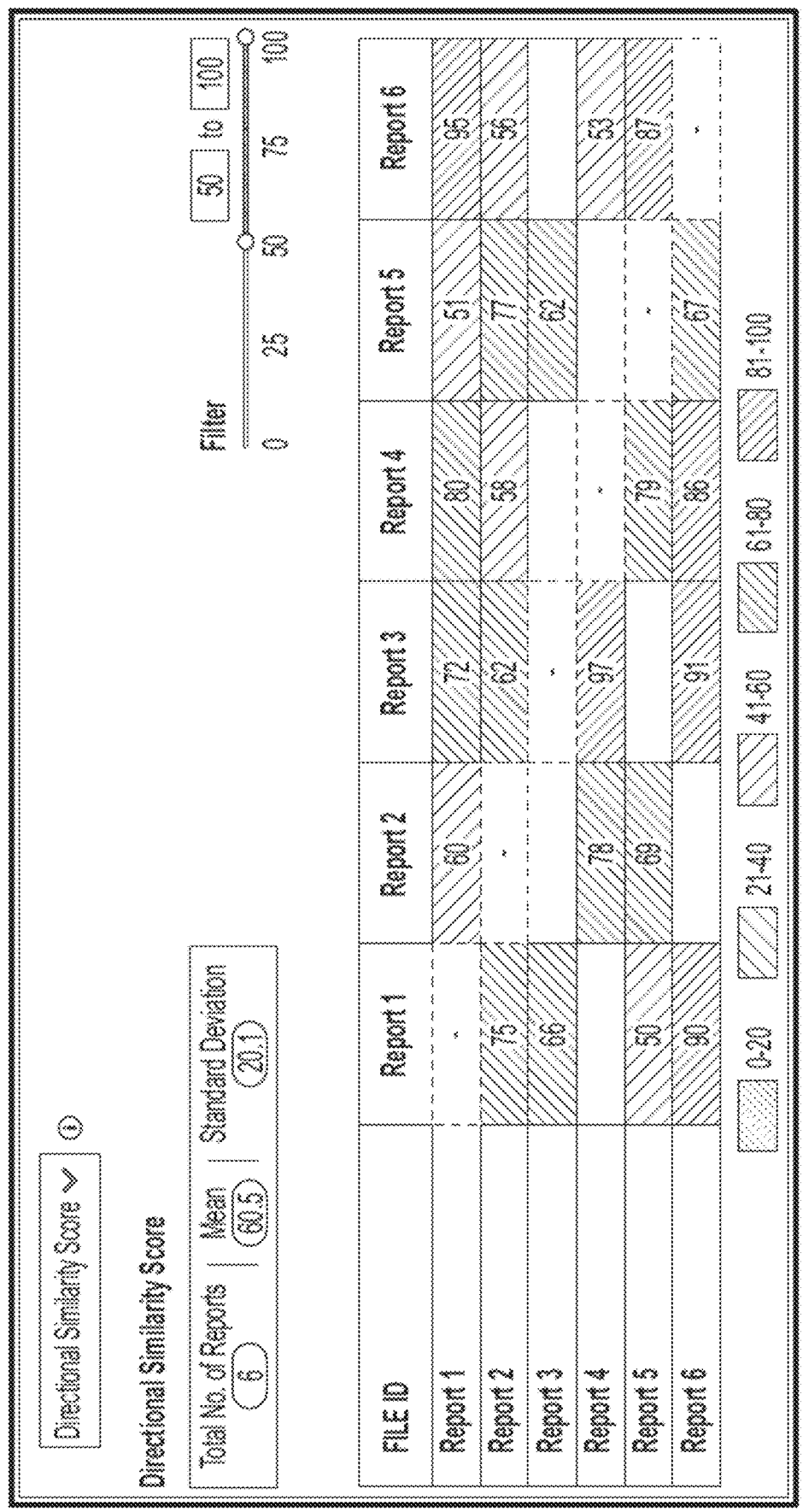
FIGS. 5A and 5B show an exemplary graphical user interface for displaying a visual representation of similarities between reports, according to some embodiments.
Figure 5B:
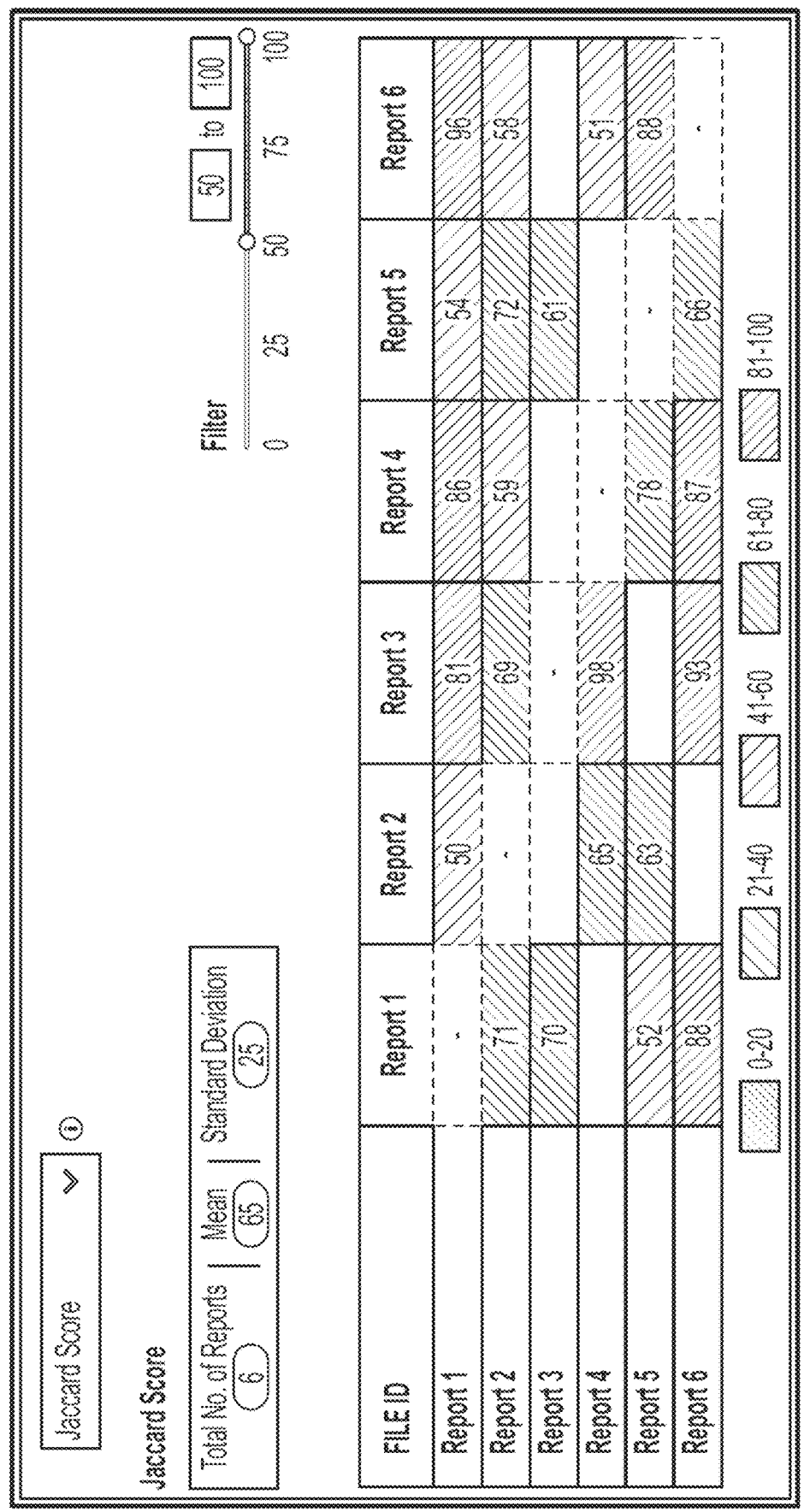

FIGS. 5A and 5B show an exemplary graphical user interface for displaying a visual representation of similarities between reports. The graphical user interface may be a web-based user interface that may be accessed from any device that is connected to the Internet (e.g., laptop computer, desktop computer, tablet, or smartphone). The graphical user interface may be configured to allow the user to interact with the visual representation in order to receive additional information.

In some embodiments, the graphical user interface may include one or more tables displaying the degree of similarity between one or more pairwise combinations of reports. Each column and row in a given table may correspond to a report such that each cell in the table indicates a degree of similarity between the reports in the respective column and row. In some embodiments, the degree of similarity displayed in the table may be a Jaccard score or a directional similarity score. The cells in the table may be color coded so as to provide a heat map, as described above with reference to FIGS. 2-4. The graphical user interface may be configured to allow a user to change the similarity metric displayed in the table from Jaccard score to directional similarity score or from directional similarity score to Jaccard score, for example by selecting a text string corresponding to the name of the desired similarity metric on a drop-down menu. FIG. 5A shows a table displaying directional similarity scores, while FIG. 5B shows a table displaying Jaccard scores.

In some embodiments, where a cell corresponds to a row and column having the same name (i.e., referring to the same report), the cell may be labeled to indicate that it refers to a comparison of a report with itself. In FIGS. 5A and 5B, for example, such cells are outlined with a dashed line and contain only a dash in the cell.

In some embodiments, the graphical user interface may include a filtering mechanism. Using the filtering mechanism, a user may select a subset of pairwise combinations of reports for which to display a similarity metric. For example, as shown in FIG. 5A, a user may choose to view the directional similarity score for pairwise combinations of reports for which the directional similarity score is in the range of 0.50-1, or 50%-100% by adjusting a slider. Pairwise combinations of reports falling outside of the range specified by the slider may be represented in the table by a blank cell, as shown in FIG. 5A. The same functionality may be available for the table of Jaccard scores, shown in FIG. 5B.

In some embodiments, the graphical user interface may include statistics about the data shown in the table, such as the total number of reports compared and the mean and standard deviation for the similarity metric shown in the table.

In some embodiments, the graphical user interface may be configured to allow a user to download a version of the information displayed on the graphical user interface. The downloadable version of the information may be provided in any appropriate file format, including (but not limited to) Excel files or CSV files.

In some embodiments, the graphical user interface may be configured to enable a user to interact with the visual representation in order to receive additional information, such as possible options for report processing operations. In some embodiments, the user may select a region visually indicating the degree of similarity between a pairwise combination of reports. Upon receipt of the selection, the graphical user interface may be configured to display a plurality of options for report processing operations that can be executed on the pairwise combination, such as merging or otherwise combining the reports. If the user selects an option, the selection may cause the system to execute the one or more selected report processing operations.

In some embodiments, the graphical user interface may be configured to enable a user to create a dashboard. The dashboard may be configured to display detailed insights about the plurality of reports analyzed by the system, including (but not limited to) the number of files uploaded to the system, the types of files uploaded, the sources from which the files were obtained, the number of pairwise combinations of reports having a Jaccard score within a certain range, or the number of pairwise combinations of reports having a similarity score within a certain range. In some embodiments, software capable of generating dashboards, such as Microsoft Power BI, may be integrated into the system. In some embodiments, the graphical user interface may be configured to allow a user to request that a dashboard be generated. Once a dashboard is generated, the graphical user interface may be configured to allow a user to modify the dashboard to display the desired type and quantity of insights.

Figure 6:
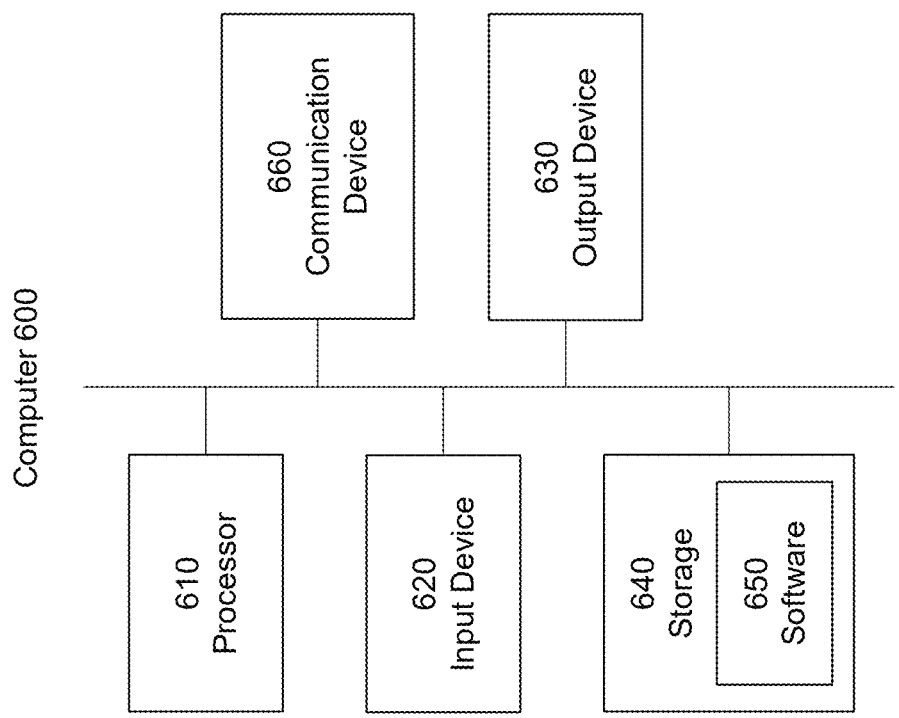
FIG. 6 shows a computer system, according to some embodiments.

In one or more examples, the disclosed systems and methods utilize or may include a computer system. FIG. 6 illustrates an exemplary computing system according to one or more examples of the disclosure. Computer 600 can be a host computer connected to a network. Computer 600 can be a client computer or a server. As shown in FIG. 6, computer 600 can be any suitable type of microprocessor-based device, such as a personal computer, workstation, server, or handheld computing device, such as a phone or tablet. The computer can include, for example, one or more of processor 610, input device 620, output device 630, storage 640, and communication device 660. Input device 620 and output device 630 can correspond to those described above and can either be connectable or integrated with the computer.

Input device 620 can be any suitable device that provides input, such as a touch screen or monitor, keyboard, mouse, or voice-recognition device. Output device 630 can be any suitable device that provides an output, such as a touch screen, monitor, printer, disk drive, or speaker.

Storage 640 can be any suitable device that provides storage, such as an electrical, magnetic, or optical memory, including a random-access memory (RAM), cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein.

Software 650, which can be stored in storage 640 and executed by processor 610, can include, for example, the programming that embodies the functionality of the present disclosure (e.g., as embodied in the systems, computers, servers, and/or devices as described above). In one or more examples, software 650 can include a combination of servers such as application servers and database servers.

Software 650 can also be stored and/or transported within any computer-readable storage medium for use by or in connection with an instruction execution system, apparatus, or device, such as those detailed above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

As used herein, the singular forms "a", "an", and "the" include the plural reference unless the context clearly dictates otherwise. Reference to "about" a value or parameter herein includes (and describes) variations that are directed to that value or parameter per se. For example, description referring to "about X" includes description of "X". It is understood that aspects and variations of the invention described herein include "consisting of" and/or "consisting essentially of" aspects and variations.

When a range of values or values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A system for generating a visual representation of similarities between reports, the system comprising one or more processors configured to cause the system to:

receive input data comprising a plurality of reports from one or more information sources;

for each report from the plurality of reports, extract metadata, wherein the metadata is distinct from data values in the respective report and indicates a plurality of data types of the data values in the respective report;

for each pairwise combination of reports from the plurality of reports, compute one or more similarity metrics based on the extracted metadata for each report in the respective pairwise combination, wherein each similarity metric of the one or more similarity metrics indicates a degree of similarity between metadata of a pairwise combination of reports from the plurality of reports; and generate and display a visual representation of similarities between each pairwise combination of reports from the plurality of reports, wherein the visual representation is generated based on the one or more computed similarity metrics for each pairwise combination.

2. The system of claim 1, wherein the plurality of data types comprises any one or more of titles, summaries, tables, visualization elements, creation dates, or keywords.

3. The system of claim 1, wherein the one or more similarity metrics comprise a first similarity metric representing a first relationship between metadata of a pairwise combination of reports from the plurality of reports and a second similarity metric representing a second relationship between the metadata of the pairwise combination of reports.

4. The system of claim 3, wherein the first similarity metric comprises a Jaccard score.

5. The system of claim 3, wherein the second similarity metric comprises one or more directional similarity scores.

6. The system of claim 1, wherein computing one or more similarity metrics comprises:

computing, for each pairwise combination of reports from the plurality of reports, a first similarity metric representing a first relationship between metadata of the respective pairwise combination of reports;

selecting a subset of pairwise combinations of reports from the plurality of reports for which the first similarity metric exceeds a minimum threshold degree of similarity; and computing a second similarity metric for each pairwise combination of reports in the selected subset, wherein the second similarity metric represents a second relationship between the metadata of the respective pairwise combination of reports in the selected subset.

7. The system of claim 1, wherein each similarity metric of the one or more similarity metrics indicates an inferred degree of combinability of a pairwise combination of reports.

8. The system of claim 1, wherein the one or more processors are configured to cause the system to generate and display one or more instructions for one or more report processing operations for at least one pairwise combination of reports from the plurality of reports based on the one or more similarity metrics.

9. The system of claim 8, wherein the one or more report processing operations comprises merging a pairwise combination of reports.

10. The system of claim 8, wherein the one or more processors are configured to cause the system to execute the instructions for the one or more report processing operations on at least one pairwise combination of reports from the plurality of reports.

11. The system of claim 1, wherein the visual representation of similarities between each pairwise combination of reports from the plurality of reports comprises a first region visually indicating a first degree of similarity for a first pairwise combination of reports and a second region visually indicating a second degree of similarity for a second pairwise combination of reports.

12. The system of claim 11, wherein the one or more processors are configured to cause the system to:
   detect a first user input comprising a selection of the first region; and
   in response to detecting the first user input, display the one or more similarity metrics for the first pairwise combination of reports.

13. The system of claim 11, wherein the one or more processors are configured to cause the system to:
   detect a first user input comprising a selection of the first region; and
   in response to detecting the first user input, display a plurality of visual indications of options for report processing operations that can be executed on the first pairwise combination of reports.

14. The system of claim 13, wherein the one or more processors are configured to cause the system to:
   detect a second user input comprising a selection of a visual indication of the plurality of visual indications, wherein the visual indication represents a first option from the plurality of options for report processing operations; and
   in response to detecting the second user input, execute the first option on the first pairwise combination of reports.

15. A method for generating a visual representation of similarities between reports, the method comprising:
   receiving input data comprising a plurality of reports from one or more information sources;
   for each report from the plurality of reports, extracting metadata, wherein the metadata is distinct from data values in the respective report and indicates a plurality of data types of the data values in the respective report;
   for each pairwise combination of reports from the plurality of reports, computing one or more similarity metrics based on the extracted metadata for each report in the respective pairwise combination, wherein each similarity metric of the one or more similarity metrics indicates a degree of similarity between metadata of a pairwise combination of reports from the plurality of reports; and
   generating and displaying a visual representation of similarities between each pairwise combination of reports from the plurality of reports, wherein the visual representation is generated based on the one or more computed similarity metrics for each pairwise combination.

16. A non-transitory computer readable storage medium storing instructions that, when executed by one or more processors of an electronic device, cause the device to:
   receive input data comprising a plurality of reports from one or more information sources;
   for each report from the plurality of reports, extract metadata, wherein the metadata is distinct from data values in the respective report and indicates a plurality of data types of the data values in the respective report;
   for each pairwise combination of reports from the plurality of reports, compute one or more similarity metrics based on the extracted metadata for each report in the respective pairwise combination, wherein each similarity metric of the one or more similarity metrics indicates a degree of similarity between metadata of a pairwise combination of reports from the plurality of reports; and
   generate and display a visual representation of similarities between each pairwise combination of reports from the plurality of reports, wherein the visual representation is generated based on the one or more computed similarity metrics for each pairwise combination.

\* \* \* \* \*